March 18, 1952     H. C. ENGEL ET AL     2,589,786

METHOD OF FORMING HOLLOW PLASTIC BODIES

Filed April 10, 1945     2 SHEETS—SHEET 1

*INVENTORS*
HARRY C. ENGEL, REGIS RAAB,
BY    THEODORE PAJAK

Donald W. Farrington
ATTORNEY

March 18, 1952   H. C. ENGEL ET AL   2,589,786
METHOD OF FORMING HOLLOW PLASTIC BODIES
Filed April 10, 1945   2 SHEETS—SHEET 2

INVENTORS
HARRY C. ENGEL, REGIS RAAB
BY THEODORE PAJAK

ATTORNEY

Patented Mar. 18, 1952

2,589,786

UNITED STATES PATENT OFFICE 2,589,786

METHOD OF FORMING HOLLOW PLASTIC BODIES

Harry C. Engel, Towson, Regis Raab, Baltimore, and Theodore Pajak, Dundalk, Md., assignors to The Glenn L. Martin Company, Middle River, Md., a corporation of Maryland Application April 10, 1945, Serial No. 587,546

4 Claims. (Cl. 154—83)

Our invention relates to a method of forming a hollow body of thermo-setting material and more particularly a method of forming and joining shells of plastic material to provide a unitary integral structure by the use of one forming mold.

The hollow plastic bodies known in the art are characterized by great strength and light weight and are capable of withstanding severe buckling loads. However, their use has been limited in the past due to the high cost of production incident to prior art methods. These methods are limited to difficult molding procedures requiring the use of accurately formed costly machined dies. The high cost of such dies must necessarily be charged to the finished article which results in high unit cost where there are a relatively few units produced. This is particularly true in the aircraft and other industries in which designs do not remain static, but are subject to frequent changes.

The present invention provides a low cost method of forming a hollow body of thermo-setting plastic material wherein a molding form of low cost material is utilized to form a core around which half shells are formed and subsequently bonded together into a unitary hollow structure of the configuration of the original mold. This method avoids the necessity of making preforming molds and further allows for the incorporation of accurately located reinforcings so as to attain maximum strength within a weight range. The complete omission of a core during the bonding cycle of the molding operation permits the sealed-in space between the surface structures to be spaced by integrally formed bulkheads or reinforcing members. This arrangement allows reinforced areas to be designed into the structure so as to provide for the insertion of attaching means without the addition of undesirable weight.

It is among the objects of our invention to provide a low cost method for the production of hollow plastic bodies in which a single mold is utilized to form a core around which the desired structure is formed in half shells and later bonded together and formed into a unitary structure in the said core forming mold.

A further object is to provide a method of forming hollow bodies of thermo-setting plastic material having integrally formed spaced reinforcing inserts.

Other objects of our invention will become apparent from the following description when taken in conjunction with the accompanying drawings in which like numbers refer to like parts in different views.

Figure 1:
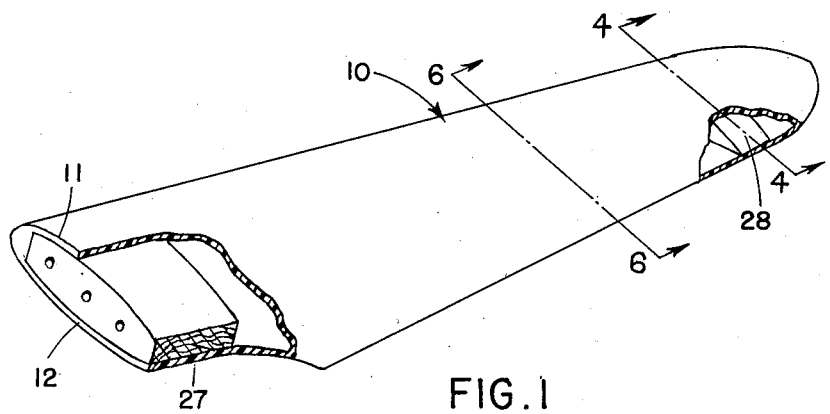
Figure 1 is a perspective view with parts broken away of an airfoil formed in accordance with our invention.

Referring to Figure 1, we have illustrated a molded airfoil 10 consisting of a top half 11 and a bottom half 12 formed of predetermined thicknesses of composite or laminated resinous material bonded together into a unitary structure. Formed integral with the said halves at the large or base end is a reinforced section 27 in which an insert of fibre, or like material, provides a higher density area for insertion of securing bolts and a similar insertion 28 is provided near the small end, or tip, as an auxiliary attachment strip.

Figure 2:
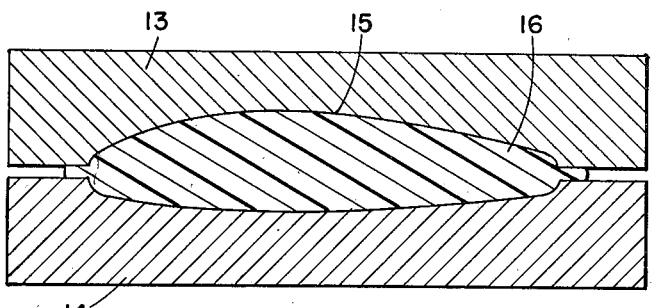
Figure 2 is a sectional view of the core as it is formed in a conventional mold.
Figure 3:
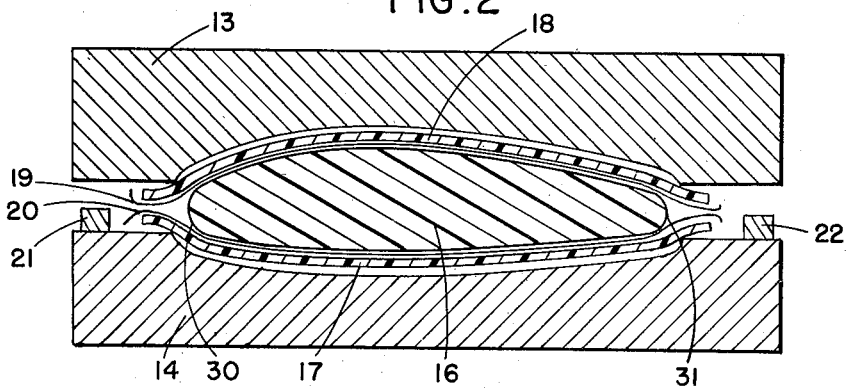
Figure 3 is a sectional view of the materials to be molded into bottom and top halves of the finished article stacked with the core form in the mold preparatory to being molded.

In forming such a structure we employ a conventional mold of the desired shape and size of inexpensive casting metal, such as zinc or a like material. The mold comprises a top section 13 and bottom section 14, as shown in Figures 2 and 3. When closed, the interior surfaces of cavity 15 form the outside contours of the article to be molded. A predetermined quantity of light, fibrous thermosetting resin impregnated material is inserted into cavity 15 and molded at a relatively high pressure of approximately 1,000 pounds per square inch so as to form a substantial core of the size and shape of cavity 15. The material so formed into the core 16 is cured by the application of heat at a temperature of approximately 300° F. for about fifteen minutes. It is then cooled and removed from the press for further use in our process. Its surfaces are smoothed by sanding and the longitudinal edges 30 and 31 are reduced in size to avoid pinching of the shell molding material at the mold joints during the subsequent steps of the process.

The second step of our method includes the making of the top half 11 and the bottom half 12 of the airfoil 10 as half shells formed and molded to the contours of the mold cavity 15 over core 16.

The desired quantity and type of thermosetting shell forming material necessary to the finished structure, as determined by stress analysis, is assembled on each side of the core and placed in mold cavity 15 as shown in Figure 3. The core covering that ultimately forms the walls of the finished article preferably comprises stock known in the art as "sandwich material." Usually such material includes a low density core of phenolic impregnated fibers bonded on opposed surfaces with phenolic impregnated paper or fabric. The covering comprises layers 17 and 18 of sandwich material selected with respect to thickness and specific gravity to conform with the strength requirement dictated by the stress analysis calculations for the finished article. Parting sheets 19 and 20, consisting of films of cellulose material, are placed between the layers 17—18 and core 16 to prevent the shells being formed from sticking to the core. The stops 21 and 22 are placed between the mold forms 13 and 14 on each side of the mold cavity 15. These stops are proportioned to limit compression of the materials being molded to obtain a predetermined wall thickness and density in the finished article.

The mold containing the assembled materials as shown in Figure 3 is placed in a molding press for further processing. Closing of the press brings top section 13 and bottom section 14 of the mold together as determined by the aforedescribed stops 21 and 22 pressing the bottom layer 17 and the top layer 18 between the mold forms and the core 16 to conform to the size and contour of mold cavity 15. In this condition the compressed materials are cured by application of heat at a temperature of from 275° to 300° F. for about fifteen minutes.

The molded shells are then removed and further processed by having the rims 23 and 24 on the top section 11, and 25 and 26 on the bottom section 12 trimmed and cut away. We have found that this step can be handled most expeditiously on a router and that the rims can be utilized as guides for the router bit during the trimming operation in which the edges of the rims are reduced in thickness to about one-half the thickness predetermined for the walls. This thickness has been found to give the best bonding results; however, it is to be appreciated that this thickness may be varied in those instances where strength requirements vary and where size tolerances permit a greater variation. In this condition the shells formed as top 11 and bottom 12 are ready for joining together into a unitary structure having the shape of cavity 15. Our method permits of free access to the interior of the structure surfaces during the assembling operation to provide for the accurately positioning of any reinforcing inserts.

Figure 4:
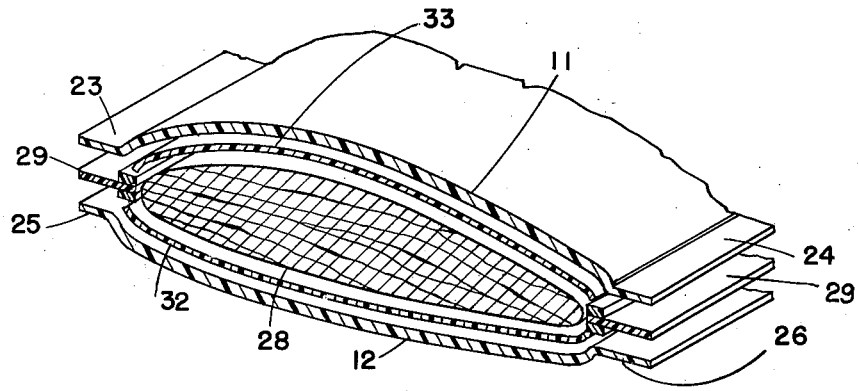
Figure 4 is a perspective view part in section of the halves in their formed condition prior to being bonded together to provide a unitary structure.
Figure 5:
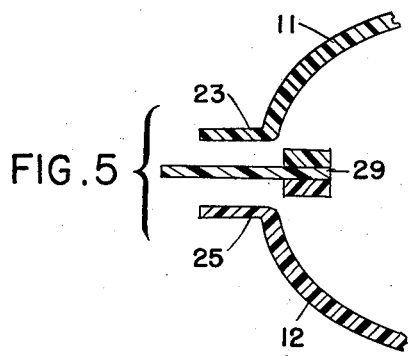
Figure 5 is an enlarged sectional view of abutting edges of the halves showing the insertion of bonding material preparatory to bonding.

One shell is first placed in suitable position for assembly. This can either be the top half 11 or the bottom half 12 whichever half is best adapted to receive and hold the inserts required in the finished article. The interior surfaces of the shells being shaped to the exact contour of core 16 allow for shaping of the inserts 27 and 28 to exact dimensions. Positioning of the reinforcing inside of the shells is illustrated in Figure 4, which shows insert 28 of wood, or like material, separated from the walls of the shells by bottom bonding strip 32 and top bonding strip 33. Preferably the bonding strips comprise thin layers of light, fibrous, resin impregnated sheet material cut to correspond to the width of the insert. These strips of bonding material effect a bond between the reinforcing inserts and the shells under final curing in the mold. Following arrangement of the inserts within the shell 12, a quantity of light, fibrous resin impregnated material 29 is placed on rim of the shell 12. The positioning of the bonding material between the rims is illustrated in Figure 5, which shows an enlarged view of rims 23 and 25 of sections 11 and 12 separated by bonding filler 29 prior to the shells being bonded to each other.

In forming a structure resistant to high impact stresses at particular points or to provide securing points for the insertion of bolts and other securing means, areas of higher density are provided by the use of inserts between the halves as above described. Arrangement of these inserts in the finished article is illustrated in Figure 1 which shows the airfoil structure 10 provided with one high density insert 27 positioned in the large or base end of the airfoil drilled for bolting to an aircraft structure, and a second insert 28 positioned near the tip as a reinforcing bulkhead. A further advantage of our method of providing such reinforcements in the interior is that their use does not alter the contour of the structure or create rough surface irregularities which would necessitate refinishing. The cost of adding such reinforcings is limited as no additional tooling or model changes are required.

The final bonding operation is accomplished by placing the assembly consisting of the top section 11 and bottom section 12, separated by bonding filler 29 (Fig. 5), and desired inserts into cavity 15 of the mold theretofore used to form core 16. The assembly is then bonded into a unitary structure by the application of heat at a temperature of from 275° to 310° F. for approximately eight to fifteen minutes. Pressure and heat occasioned by the molding is sufficient to cause the resin carried by the reinforcing bonding strips to flow into the adjacent pores of the wood or fiber reinforcing inserts 27 and 28 to securely bond the inserts to the shells. Similarly the resin in the rim bond material effects a permanent bond between the two shells.

Figure 6:
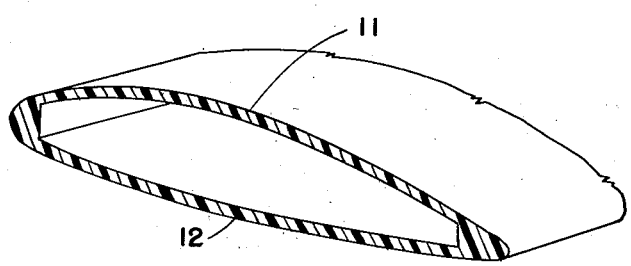
Figure 6 is a perspective view part in section on line 6—6 of the finished airfoil.

The article is allowed to cool in the mold and upon removal is ready for further finishing with regular woodworking tools to the smooth surface form of structure illustrated in Figures 1 and 6.

Comprehensive service tests of airfoils manufactured in accordance with our invention show that the strength of the bond between the joined halves is equal to, or greater than, that of the material comprising the walls thereof.

Although our invention has been described in connection with an airfoil it will be appreciated that it is suited to the making of articles of general utility particularly where a limited number of units are required and that numerous variations in material and procedure may be made without departing from the scope of the invention as defined in the following claims.

We claim:

1. That method of making a hollow body of thermo-setting material comprising filling a mold cavity corresponding to the shape of the finished body formed between a pair of abutting complementary mold sections with thermo-setting plastic material, curing the material in the cavity with heat and pressure to provide a core, removing the core from the mold and covering the opposite sides thereof in the sequence named with a parting coat and a layer of thermo-setting plastic material to form complementary shells, placing the core and cover assembly in the said mold and partially closing the same whereby the covering occupies the space between the core and the walls of the mold cavity, curing the complementary shells under heat and pressure, removing the core from the complementary shells and thereafter bonding the edges of the shells to each other within the said mold.

2. That method of making a hollow body of thermo-setting material comprising filling a mold cavity corresponding to the shape of the finished body formed between a pair of abutting complementary mold sections with plastic material, curing the material in the cavity with heat and pressure to provide a core, removing the core from the mold and covering the opposite sides thereof with layers of thermo-setting plastic material to form complementary shells, placing the core and cover assembly in the said mold and partially closing the same whereby the covering occupies the space between the core and the walls of the mold cavity, curing the complementary shells under heat and pressure, removing the core from the cured complementary shells and thereafter bonding the edges of the shells to each other within the said mold.

3. That method of making a hollow body of thermo-setting material comprising filling the cavity of a mold having abutting complementary mold sections with thermo-setting plastic material, curing the material in the cavity by application of heat and pressure to provide a core, removing the core from the mold and covering the opposite sides thereof in the sequence named with a parting coat and a layer of thermo-setting plastic material to form complementary shells, placing the core and cover assembly in the said mold and partially closing the same whereby the covering occupies the space between the core and the walls of the mold cavity, curing the complementary shells by application of heat and pressure, removing the cured complementary shells from the core, placing reinforcing inserts within the shells and bonding the assembly of inserts and shells to each other as a unitary structure in the said mold.

4. That method of making a hollow body of thermo-setting phenolic resin material comprising filling the cavity of a mold having abutting complementary mold sections with thermo-setting plastic material, curing the material in the cavity by application of heat and pressure to provide a core, removing the core from the mold and covering the opposite edges thereof in the sequence named with a parting coat and a layer of thermo-setting plastic material to form complementary shells, placing the core and cover assembly in the said mold and partially closing the same whereby the covering occupies the space between the core and the walls of the mold cavity, curing the complementary shells by application of heat at a temperature of from 275° to 310° F. for about fifteen minutes, removing the core from the cured complementary shells and thereafter bonding the edges of the shells to each other within the said mold.

HARRY C. ENGEL.
REGIS RAAB.
THEODORE PAJAK.

REFERENCES CITED

The following references are of record in the file of this patent:

UNITED STATES PATENTS

| Number | Name | Date |
|---|---|---|
| 639,096 | Sagendorph | Dec. 12, 1889 |
| 1,134,433 | Aylsworth | Apr. 6, 1915 |
| 1,400,146 | Eggers et al. | Dec. 13, 1921 |
| 1,729,717 | Gammeter | Oct. 1, 1929 |
| 2,009,265 | Hirschfield | July 23, 1935 |
| 2,342,988 | Vidal | Feb. 29, 1944 |